US006762788B2

(12) United States Patent
Chang

(10) Patent No.: US 6,762,788 B2
(45) Date of Patent: Jul. 13, 2004

(54) WIRELESS VIDEO/AUDIO TRANSMISSION DEVICE FOR BI-DIRECTIONAL COMMUNICATIONS

(75) Inventor: Mu Jung Chang, Jubei (TW)

(73) Assignee: Tranwo Technology Corp., Hsinchu (TW)

( * ) Notice: Subject to any disclaimer, the term of this patent is extended or adjusted under 35 U.S.C. 154(b) by 280 days.

(21) Appl. No.: 10/141,064

(22) Filed: May 9, 2002

(65) Prior Publication Data

US 2003/0210325 A1 Nov. 13, 2003

(51) Int. Cl.[7] .................................................. H04N 7/14

(52) U.S. Cl. ............................... 348/14.02; 348/14.12; 348/158; 455/410; 379/102.06

(58) Field of Search ........................... 348/14.01–14.06, 348/14.12, 158, 723; 455/78, 410; 379/102.01–102.06

(56) References Cited

U.S. PATENT DOCUMENTS 5,657,380 A * 8/1997 Mozer .................. 379/102.06
5,903,322 A * 5/1999 Chen .......................... 348/723
6,256,479 B1 * 7/2001 Hoffmann et al. ............ 455/78

* cited by examiner

*Primary Examiner*—Wing Fu Chan
(74) *Attorney, Agent, or Firm*—Rosenberg, Klein & Lee

(57) ABSTRACT

The present invention provides a wireless video/audio transmission device for bi-directional communications, which comprises an emitting device and a receiving device. The emitting device comprises a 2.4 GHz or 5.7 GHz emitting module and a UHF receiving module. The receiving device comprises a 2.4 GHz or 5.7 GHz receiving module and a UHF emitting module. Video, audio, and a digital control instruction are emitted out by the emitting module after signal processing and transmitted to the receiving module. The receiving module is used to demodulate and convert the signal into a video, an audio, and an output control instruction. A control instruction and an analog audio signal are mixed and modulated by the UHF emitting module and emitted out to the UHF receiving module, thereby demodulating and converting the signal into an audio signal and an output instruction. The present invention accomplishes the capacity of bi-directional communications of audio and digital control to have the functions of intercommunications and security by digital codes.

20 Claims, 4 Drawing Sheets

WIRELESS VIDEO/AUDIO TRANSMISSION DEVICE FOR BI-DIRECTIONAL COMMUNICATIONS

FIELD OF THE INVENTION

The present invention relates to a wireless video/audio transmission device and, more particularly, to a wireless video/audio transmission device having bi-directional communications function.

BACKGROUND OF THE INVENTION

Along with continual progress of scientific technology, the development of wireless video/audio transmission device becomes full-blown everyday. Commercially available wireless video/audio transmission devices generally use 900 MHz or 2.4 GHz wireless communications channel. As shown in FIG. 1, a basic wireless video/audio transmission device 10 comprises an emitting device 12 and a receiving device 14. The emitting device 12 includes a sound processing circuit 16, a mixer 18, and a modulator 20. The sound processing circuit 16 is exploited to convert audio left and audio right into a sound signal, which is transferred to the mixer 18 along with a video signal captured by a video source. The sound signal and the video signal are modulated by the modulator 20 into a first carrier signal, which is then emitted to the receiving device 14. After a demodulator 22 in the receiving device 14 is used to demodulate the received carrier signal and a sound processing circuit 24 is used for processing sound, the restored sound is outputted by a speaker device and the restored video signal is outputted by a display.

Another kind of remote control type wireless video/audio transmission device in the prior art is the above basic wireless video/audio transmission device matched with the UHF emitting and receiving function for transmitting infrared signals of remote controller. As shown in FIG. 2, a 2.4 GHz emitting module 26 and a UHF receiving module 28 are disposed in an emitting device 12. A 2.4 GHz receiving module 30 and a UHF emitting module 32 are disposed in a receiving device 14. The actions of the 2.4 GHz emitting module 26 and the 2.4 GHz receiving module 30 are the same as those of the above basic wireless video/audio transmission device. An infrared receiving module 36, an optical converter 38, and a UHF modulator 40 are disposed in the UHF emitting module 32. The infrared receiving module 36 is used to receive an infrared signal emitted by the infrared remote controller. The optical converter 38 is used to convert the infrared signal into an electronic signal, which is then modulated by the modulator 40 into a second carrier signal to be emitted out. A UHF demodulator 42, an optical converter 44, and an infrared emitting module 46 are disposed in the UHF receiving module of the emitting device 12. After the UHF receiving module 28 receives the second carrier signal, the UHF demodulator 42 and the optical converter 44 are used to demodulate and restore it into an infrared signal, which is then emitted to remotely control the operations of the audio left and audio right sound sources and the video source.

The above two kinds of wireless video/audio transmission device can provide convenient video/audio transmission. Moreover, the remote control type wireless video/audio transmission device has additional remote control function and thus is more appreciated. However, it only has unidirectional remote control and unidirectional transmission and reception design, and cannot meet the requirements of some more advanced, complicated, and important applications, e.g., real-time bi-directional intercommunication of sound and security by discrimination codes. Therefore, this wireless video/audio transmission device cannot apply to the designs of bi-directional intercommunication at a doorbell and unlocking of a door by codes. Accordingly, the present invention aims to propose a novel wireless video/audio transmission device, which has, in addition to wireless video/audio transmission function, the advantages of bi-direction intercommunication and security by discrimination codes.

SUMMARY OF THE INVENTION

The primary object of the present invention is to propose a wireless video/audio transmission device having the functions of bi-directional intercommunication and security by digital codes. The wireless video/audio transmission device uses an emitting device to simultaneously modulate a video/audio signal and a control signal in a 2.4 GHz or 5.7 GHz channel and then transmit them to a receiving device. The receiving device demodulates the video/audio signal and the control signal and transmits them back to the emitting device in a UHF channel. A highly integrated bi-directional communications system is thus provided.

Another object of the present invention is to provide a wireless video/audio transmission device, which integrates a 2.4 GHz or 5.7 GHz channel and a UHF channel into the same device to accomplish bi-directional communications capacity of sound and digital control, and simultaneously has the advantage of unidirectionally transmitting video in the 2.4 GHz or 5.7 GHz channel.

According to the present invention, a wireless video/audio transmission device for bi-directional communications comprises an emitting device and a receiving device. The emitting device comprises a first channel emitting module and a second channel receiving module. The receiving device comprises a first channel receiving module and a second channel emitting module. Video, audio, and a digital control instruction are processed by a signal processing circuit of the first channel emitting module, and are emitted out by a first channel modulator and transmitted to a first channel receiving module at another place. The first channel demodulator in the first channel receiving module is used to demodulate the signal into video, audio, and an output instruction. On the other hand, after a digital control instruction and an analog audio signal are mixed by the second channel emitting module and modulated by a second channel modulator, the signal is emitted out and transmitted to the second channel receiving module. A second channel demodulator is used to demodulate the signal into a baseband signal, which is then restored back to an audio signal and an output instruction.

The various objects and advantages of the present invention will be more readily understood from the following detailed description when read in conjunction with the appended drawing, in which:

DETAILED DESCRIPTION OF THE PREFERRED EMBODIMENTS

Figure 1:
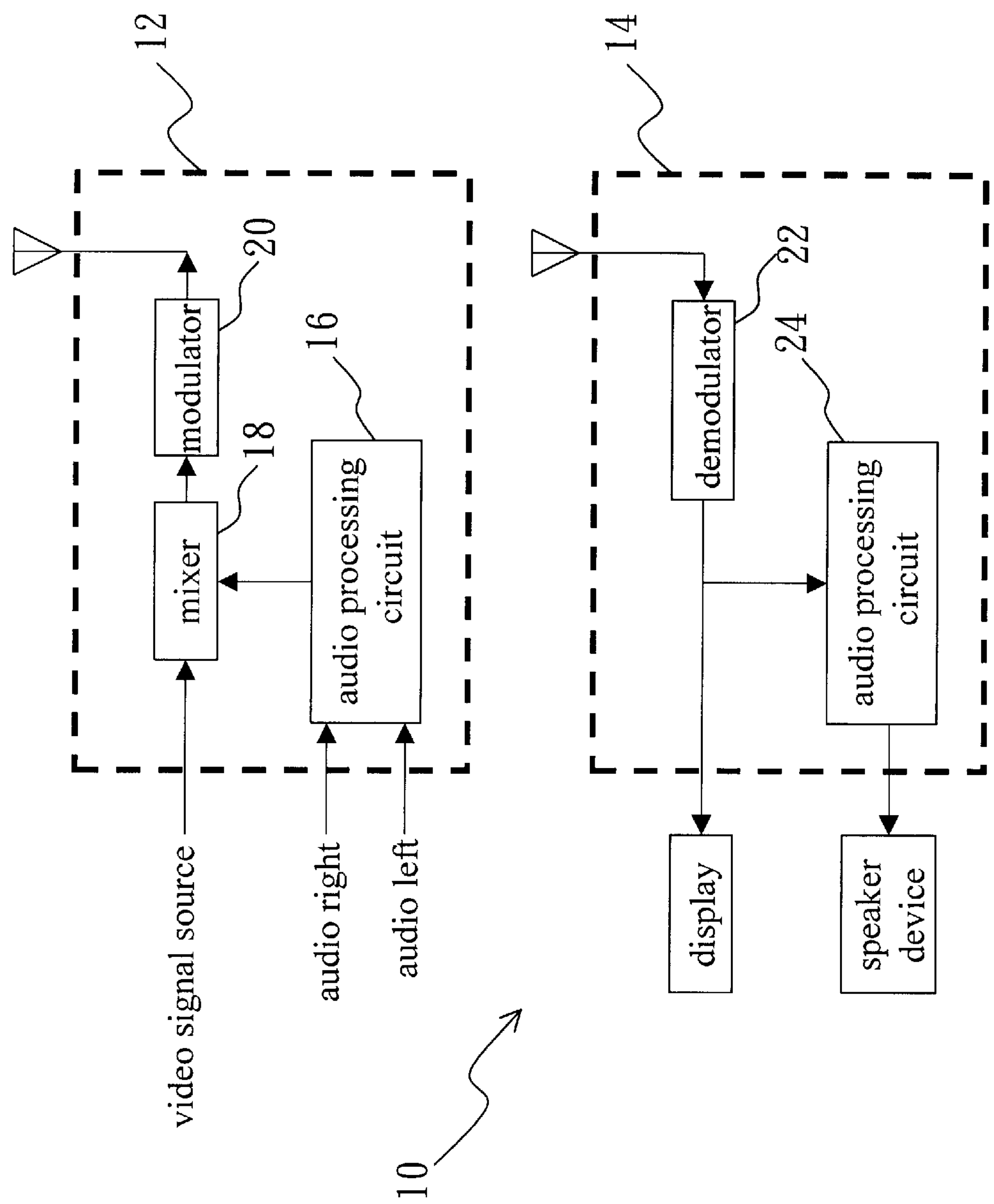
FIG. 1 is a block diagram of a kind of wireless video/audio transmission device in the prior art.
Figure 2:
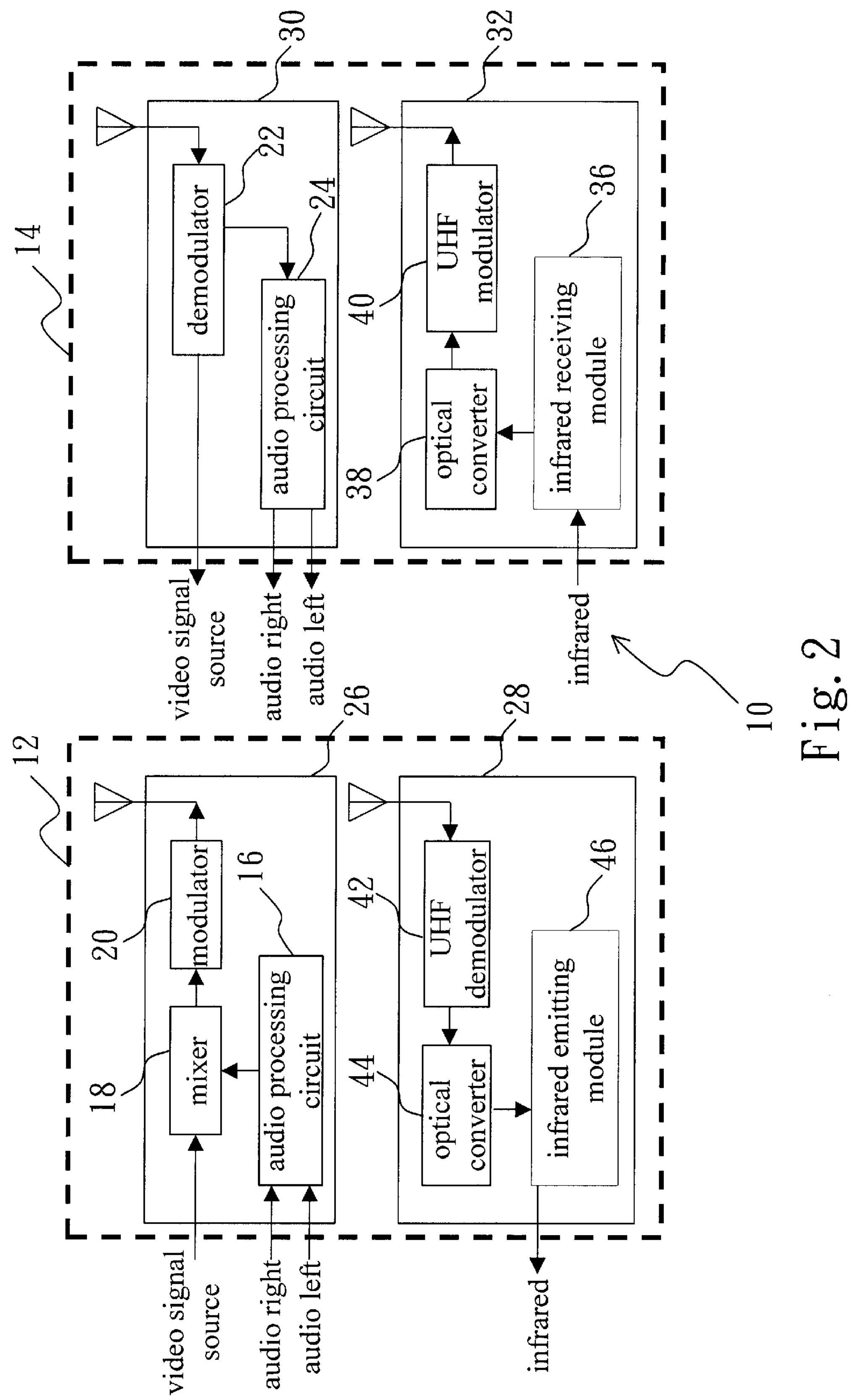
FIG. 2 is a block diagram of another kind of wireless video/audio transmission device in the prior art; and FIG. 3*a* and FIG. 3*b* is a block diagram of the present invention.
Figure 3A:
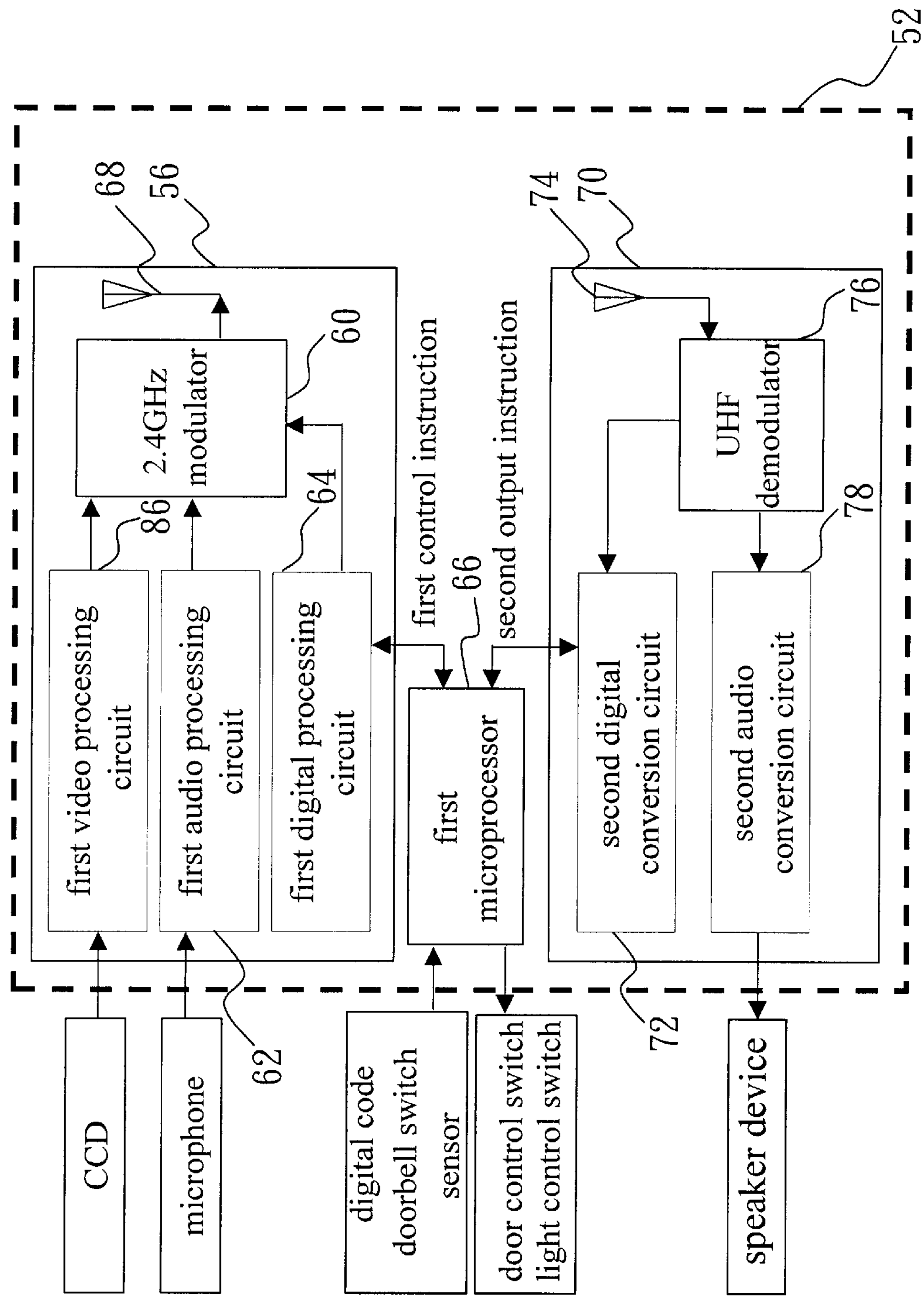
Figure 3B:
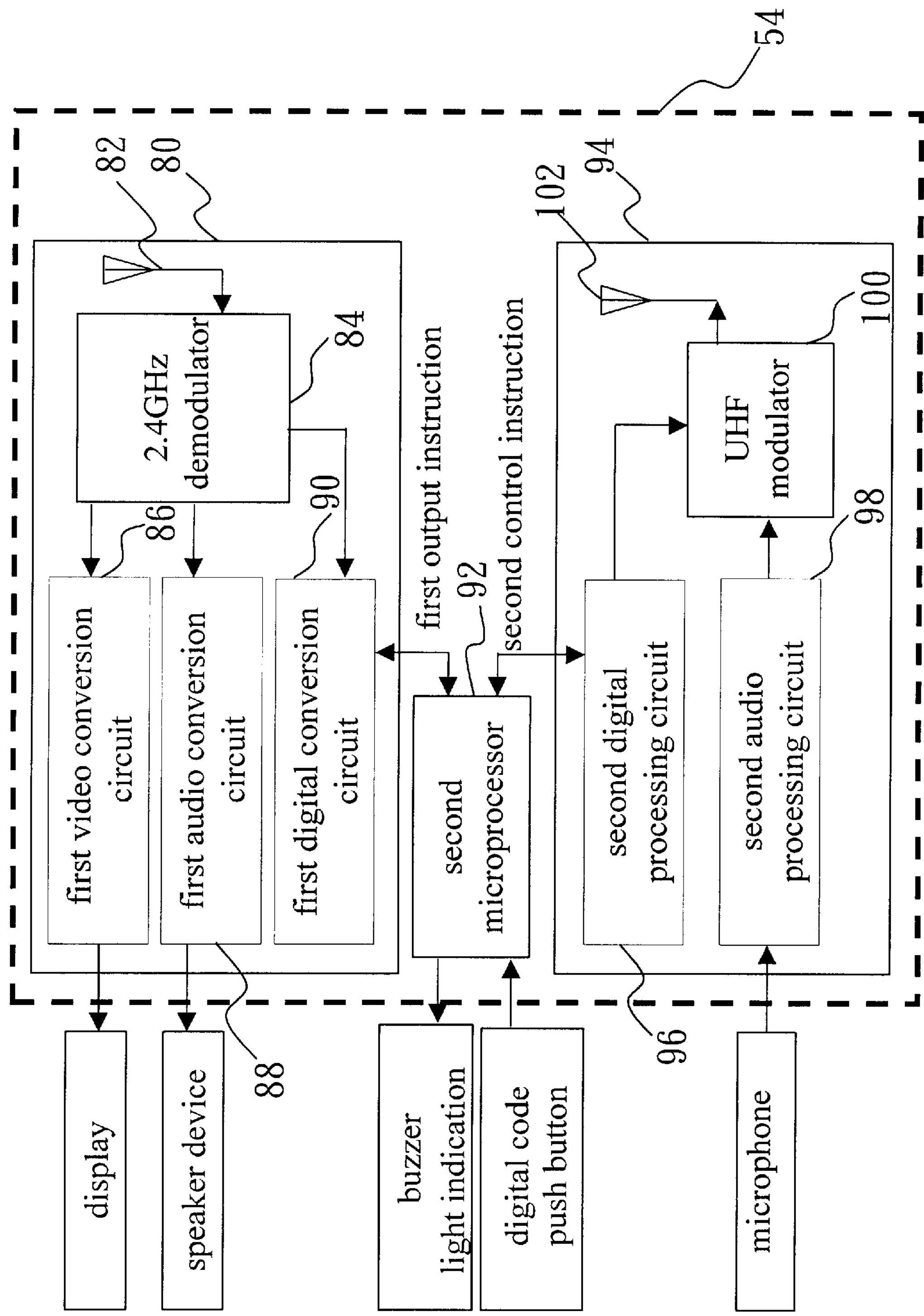

As shown in FIG. 3*a* and FIG. 3*b*, the present invention comprises an emitting device 54 and a receiving device 56.

The emitting device 54 comprises a first channel emitting module, usually being a 2.4 GHz emitting module 56. A first video processing circuit 58 connected to an external video signal source is disposed in the 2.4 GHz emitting module 56 for receiving and processing video from the video signal source and converting it into a video signal, which is then transmitted to a 2.4 GHz modulator 60. A first audio processing circuit 62 is connected to an external audio source for receiving and processing audio from the audio source and converting it into an audio signal, which is then transmitted to the 2.4 GHz modulator 60. A first digital processing circuit 64 is connected to a first microprocessor 66, which is operated by an operator to generate a first control instruction. The first control instruction is converted by the first digital processing circuit into a control signal, which is also transmitted to the 2.4 GHz modulator 60. The video signal, the audio signal, and the control signal are simultaneously modulated by the 2.4 GHz modulator 60 onto a first carrier signal suitable for transmission, and then emitted out by a 2.4 GHz emission antenna 68. The above first microprocessor 66 is connected to a second digital conversion circuit 72 in a second channel receiving module, usually being a UHF receiving module 70. A UHF reception antenna 74 is disposed in the UHF receiving module 70, and is connected to a UHF demodulator 76. The output end of the UHF demodulator 76 is connected to the second digital conversion circuit 72 and a second audio conversion circuit 78. The output end of the second audio conversion circuit 78 is connected to a speaker device.

The above video signal source usually adopts a charge coupled device (CCD) or a CMOS. The audio source is a microphone. The above emitting device is installed at the doorway of a common building. The operation instruction received by the first microprocessor 66 is a digital code, doorbell pushbutton, or an input of sensor instruction.

The receiving device 54 is generally installed in a residence. The receiving device 54 uses a 2.4 GHz reception antenna 82 of a 2.4 GHz receiving module 80 to receive the first carrier signal from the 2.4 GHz emitting module 56. A 2.4 GHz demodulator 84 is used to demodulate the video signal, the audio signal, and the control signal superimposed on the first carrier signal. The demodulated signals are converted for restoration by a first video conversion circuit 86, a first audio conversion circuit 88, and a first digital conversion circuit 90, respectively. Subsequently, the video signal is outputted to a display, the audio signal is outputted to a speaker device, and the control signal is processed by a second microprocessor 92 connected to the first digital conversion circuit 90. The second microprocessor 92 then outputs a first output instruction according to the control signal. The output end of the second microprocessor 92 is connected to a buzzer and a light indication device so that the buzzer and the light indication device can respectively give out sound and light according to the second control instruction, respectively.

A UHF emitting module 94 is disposed in the above receiving device 54. The UHF emitting module 94 comprises a second digital processing circuit 96 and a second audio processing circuit 98, which are connected to a UHF modulator 100. The output end of the UHF modulator 100 is connected to a UHF emission antenna 102. The second digital processing circuit 96 is also connected to the second microprocessor 92 so that the second microprocessor 92 can operated by an operator to generate a second control instruction. The second control instruction is converted by the second digital processing circuit 96 into a control signal and transmitted to the UHF modulator 100 to convert the audio signal and the control signal into a UHF remote control signal, which is outputted by the UHF emission antenna 102 and then received by the UHF reception antenna 74. The above UHF demodulator 76 is used to demodulate the signal into a base-band signal. According to frequency characteristics of the audio signal and the digital control instruction, the first microprocessor 66 will separate the digital control instruction from the base-band signal. The low-frequency analog audio signal is processed by the second audio conversion circuit 78 and then outputted to an external speaker device. The first microprocessor 66 issues a second output instruction according to the control signal. The second control instruction inputted to the receiving device 54 can be a digital code or a pushbutton instruction. The second output instruction issued by the first microprocessor 66 is a door control switch for unlocking a door or a light control switch for turning on or off a door light.

In the present invention, a 2.4 GHz emitting module 56 and a UHF receiving module 70 are disposed in the emitting device 52, and 2.4 GHz receiving module 80 and a UHF emitting module 94 are disposed in the receiving device 54. Therefore, bi-directional intercommunications of audio and digital control signal and unidirectional communications of video can be accomplished between the emitting device 52 and the receiving device 54. Once the emitting device 52 installed at the doorway outputs an operation instruction to the first microprocessor 66 because a doorbell switch is pressed or a guest image is sensed by a sensor, through transmission of the wireless video/audio transmission device 10, a buzzer and an light indication device installed in the residence will be controlled by the second microprocessor 92 to inform the host that there is a guest visiting. At the same time, the host can watch the guest image from a display and use a microphone to perform bi-directional intercommunications. When he wants to unlock the door, he operates the door control switch or the light control switch to let operation instructions inputted by the two switches be transmitted by the wireless video/audio transmission device 10 to unlock the door or turn on the light. If the operation instruction inputted to the first microprocessor 66 or the second microprocessor 92 is a digital code, the output of the second control instruction in the receiving device 54 and the output of the first control instruction in the emitting device 52 are enabled only after discrimination of codes, thereby enhancing the burglarproof and protection function.

On the other hand, because mono video is satisfactory enough in general surveillance applications, one of the conventional audio left source and audio right source is used for transmission of control instruction in the present invention. Moreover, digital codes and modulated signals are exploited for transmission of control signal. This kind of design utilizing the 2.4 GHz channel for integrated transmission of the video, audio, and digital control instruction and utilizing the UHF channel for integrated transmission of the audio and digital control instruction can simultaneously transmit analog and digital signals on the same channel without substantially changing the architecture of conventional wireless video/audio transmission device. Therefore, the present invention has a higher practicality and can more meet the requirements of user. Additionally, the above 2.4 GHz channel of the first channel can be replaced by the 5.7 GHz channel.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A wireless video/audio transmission device for bi-directional communications, comprising:

an emitting device comprising a first channel emitting module and a second channel receiving module, a first channel modulator being disposed in said first channel emitting module, said first channel modulator simultaneously modulating a video signal, a first audio signal, and a first control signal generated according to a first digital control instruction into a first carrier signal, which is emitted out by a first channel emission antenna, a second channel demodulator being disposed in said second channel receiving module; and a receiving device comprising a first channel receiving module and a second channel emitting module, said first channel receiving module being connected to a first channel reception antenna, a first channel demodulator being disposed in said first channel receiving module, said first channel demodulator demodulating said first carrier signal received by said first channel reception antenna back into said video signal, said first audio signal, and said first control signal, a first output instruction being outputted according to said first control signal, a second channel modulator being disposed in said second channel emitting module and used to mix and modulate a second control signal generated according to a second digital control instruction and a received second audio signal into a second carrier signal, which is emitted out by a second channel emission antenna to said second channel receiving module so that said second channel demodulator can demodulate said second carrier signal back into said second control signal and said second audio signal, a second output instruction being outputted according to said second control signal.

2. The wireless video/audio transmission device for bi-directional communications as claimed in claim 1, wherein the frequency of said first channel is selected among 2.4 GHz and 5.7 GHz, and the frequency of said second channel is a UHF channel.

3. The wireless video/audio transmission device for bi-directional communications as claimed in claim 1, wherein a microprocessor is installed in each of said emitting device and said receiving device to control input of said digital control instruction and output of said output instruction.

4. The wireless video/audio transmission device for bi-directional communications as claimed in claim 1, wherein said video signal in said first channel emitting module comes from the input of a video signal source and is received by said first channel modulator after being converted and processed by a video processing circuit, and said video signal source is selected among a charge-coupled device and a complementary metal oxide semiconductor device.

5. The wireless video/audio transmission device for bi-directional communications as claimed in claim 1, wherein said first audio signal in said first channel emitting module and said second audio signal in said second channel emitting module come from the input of microphones and are received by said first channel modulator and said second channel modulator after being converted and processed by a first audio processing circuit and a second audio processing circuit, respectively.

6. The wireless video/audio transmission device for bi-directional communications as claimed in claim 1, wherein said first control signal and said second control signal are received by said first channel modulator and said second channel modulator after being converted and processed by a first digital processing circuit and a second digital processing circuit, respectively.

7. The wireless video/audio transmission device for bi-directional communications as claimed in claim 1, wherein said video signal demodulated by said first channel demodulator is outputted to a display after being processed and converted by a first video conversion circuit.

8. The wireless video/audio transmission device for bi-directional communications as claimed in claim 1, wherein said first audio signal and said second audio signal demodulated by said first channel demodulator and said second channel demodulator are outputted to a speaker device after being processed and converted by a first audio conversion circuit and a second audio conversion circuit, respectively.

9. The wireless video/audio transmission device for bi-directional communications as claimed in claim 1, wherein said first control signal and said second control signal demodulated by said first channel demodulator and said second channel demodulator are outputted after being processed and converted by a first digital conversion circuit and a second digital conversion circuit, respectively.

10. The wireless video/audio transmission device for bi-directional communications as claimed in claim 1, wherein said first digital control instruction is selected among a digital code instruction, a doorbell pushbutton instruction, and a sensor instruction, said first output instruction is selected among a buzzer instruction and a light indication device instruction, said second digital control instruction is selected among a digital code instruction and a pushbutton switch instruction, and said second output instruction is selected among a door control switch instruction and a light control switch instruction.

11. An emitting device of a wireless video/audio transmission device, comprising:

a first channel emitting module at least comprising a first video processing circuit, a first audio processing circuit, a first digital processing circuit, and a first channel modulator; said first video processing circuit, said first audio processing circuit, and said first digital processing circuit converting video from a video signal source, audio of an audio source, and a first digital control instruction into a video signal, a first audio signal, and a first control signal and transmitting them to said first channel modulator; said first channel modulator simultaneously modulating said video signal, said first audio signal, and said first control signal into a first carrier signal, which is emitted out by a first channel emission antenna, and a second channel receiving module at least comprising a second channel demodulator, a second audio conversion circuit, and a second digital conversion circuit; said second channel demodulator demodulating a received second carrier signal into a second control signal and a second audio signal; said second audio conversion circuit being used to restore said second audio signal and output it to a speaker device; said second digital conversion circuit being used to restore said second control signal and output a second output instruction.

12. The emitting device as claimed in claim 11, wherein the frequency of said first channel is selected among 2.4

GHz and 5.7 GHz, and the frequency of said second channel is a UHF channel.

13. The emitting device as claimed in claim 11, wherein a microprocessor is further provided to control input of said first digital control instruction and output of said second output instruction.

14. The emitting device as claimed in claim 11, wherein said video signal source is selected among a charge-coupled device and a complementary metal oxide semiconductor device, and said audio source is a microphone.

15. The emitting device as claimed in claim 11, wherein said first digital control instruction is selected among a digital code instruction, a doorbell pushbutton instruction, and a sensor instruction, and said second output instruction is selected among a door control switch instruction and a light control switch instruction.

16. A receiving device of a wireless video/audio transmission device, comprising:

a first channel receiving module at least comprising a first channel demodulator, a first video conversion circuit, a first audio conversion circuit, and a first digital conversion circuit; said first channel demodulator demodulating a received first carrier signal into a first video signal, a first audio signal, and a first control signal; said first video conversion circuit and said first audio conversion circuit being used to respectively restore said first video signal and said first audio signal and output them to a display and a speaker device; said first digital conversion circuit being used to restore said first control signal and output a first output instruction; and a second channel emitting module at least comprising a second audio processing circuit, a second digital processing circuit, and a second channel modulator; said second audio processing circuit and said second digital processing circuit respectively converting audio from an audio source and a second digital control instruction into an audio signal and a second control signal and transmitting them to said second channel modulator, said second channel modulator simultaneously modulating said second audio signal and said second control signal into a second carrier signal, which is emitted out by a second channel emission antenna.

17. The receiving device as claimed in claim 16, wherein the frequency of said first channel is selected among 2.4 GHz and 5.7 GHz, and the frequency of said second channel is a UHF channel.

18. The receiving device as claimed in claim 16, wherein a microprocessor is further provided to control output of said first output instruction and input of said second digital control instruction.

19. The receiving device as claimed in claim 16, wherein said audio source is a microphone.

20. The receiving device as claimed in claim 16, wherein said first digital output instruction is selected among a buzzer instruction and a light indication device instruction, and said second digital control instruction is selected among a digital code instruction and a pushbutton switch instruction.

* * * * *